United States Patent
Kuo et al.

(10) Patent No.: US 8,989,509 B2
(45) Date of Patent: Mar. 24, 2015

(54) STREAMING WAVELET TRANSFORM

(71) Applicant: Apple Inc., Cupertino, CA (US)

(72) Inventors: Albert C. Kuo, Mountain View, CA (US); Jeffrey E. Frederiksen, Sunnyvale, CA (US); Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 13/718,442

(22) Filed: Dec. 18, 2012

(65) Prior Publication Data

US 2014/0169693 A1 Jun. 19, 2014

(51) Int. Cl.
*G06K 9/36* (2006.01)
*G06T 9/00* (2006.01)
*G06K 9/46* (2006.01)

(52) U.S. Cl.
CPC .................................... *G06T 9/007* (2013.01)
USPC ........................................................ 382/240

(58) Field of Classification Search
CPC ....... G06T 11/00; G06T 3/00; G06T 2211/00; G06T 9/007; H04N 7/26963
USPC .......................... 382/232, 233, 240, 248, 303; 348/222.1, 231.6, 234; 375/240.18, 375/240.19; 345/667
See application file for complete search history.

(56) References Cited

U.S. PATENT DOCUMENTS

| | | | |
|---|---|---|---|
| 4,990,925 A | 2/1991 | Edelsohn et al. | |
| 5,159,336 A | 10/1992 | Rabin et al. | |
| 6,101,279 A | 8/2000 | Nguyen et al. | |
| 6,289,131 B1 | 9/2001 | Ishikawa | |
| 6,633,679 B1* | 10/2003 | Yfantis | 382/240 |
| 6,825,876 B1* | 11/2004 | Easwar et al. | 348/234 |
| 7,352,298 B2 | 4/2008 | Monro | |
| 7,372,485 B1* | 5/2008 | Bodnar et al. | 348/234 |
| 7,683,908 B2 | 3/2010 | Pan et al. | |
| 8,378,859 B2 | 2/2013 | Frederiksen et al. | |
| 8,411,978 B1* | 4/2013 | Hobbs et al. | 382/240 |
| 2003/0142873 A1* | 7/2003 | Lafruit et al. | 382/240 |

(Continued)

FOREIGN PATENT DOCUMENTS

| | | |
|---|---|---|
| JP | 2009124518 | 6/2009 |
| JP | 2009124518 A | 6/2009 |
| TW | 200733735 | 9/2007 |

OTHER PUBLICATIONS

U.S. Appl. No. 12/872,517, filed Aug. 31, 2010, Jeffrey E. Frederiksen.

(Continued)

*Primary Examiner* — Amir Alavi
(74) *Attorney, Agent, or Firm* — Lawrence J. Merkel; Meyertons, Hood, Kivlin, Kowert & Goetzel, P.C.

(57) ABSTRACT

In an embodiment, a compression unit is provided which may perform compression of a pixel stream. Similarly, a decompression unit may be provided which may decompress the compressed pixel stream. The compression and decompression units may include a streaming wavelet transform, which may perform the wavelet transform through a pipeline of wavelet operations. Each section of the pipeline may perform a pass of the wavelet transform on the pixel stream, and the section may provide input to another section of the pipeline that performs a next pass of the wavelet transform. The transform may thus be performed on the fly as the pixels are received.

24 Claims, 8 Drawing Sheets

(56) References Cited

U.S. PATENT DOCUMENTS

| | | |
|---|---|---|
| 2003/0169936 A1 | 9/2003 | Zandi et al. |
| 2004/0012686 A1 | 1/2004 | Ono et al. |
| 2006/0140491 A1 | 6/2006 | Schwartz |
| 2006/0153291 A1 | 7/2006 | Christion |
| 2006/0228032 A1* | 10/2006 | Hou .............................. 382/240 |
| 2007/0067598 A1 | 3/2007 | Fujimoto |
| 2007/0071332 A1* | 3/2007 | Katayama ..................... 382/233 |
| 2009/0123085 A1 | 5/2009 | Yoshimura et al. |
| 2009/0196494 A1 | 8/2009 | Kanai |
| 2009/0285480 A1 | 11/2009 | Bennett et al. |
| 2009/0324068 A1 | 12/2009 | Yamakawa |
| 2010/0053153 A1 | 3/2010 | Baril et al. |
| 2010/0245383 A1 | 9/2010 | Tsai |
| 2010/0290522 A1 | 11/2010 | Otani |
| 2012/0014595 A1 | 1/2012 | Frederiksen et al. |
| 2014/0169693 A1* | 6/2014 | Kuo et al. ..................... 382/248 |

OTHER PUBLICATIONS

U.S. Appl. No. 13/743,544, filed Jan. 17, 2013, Jeffrey E. Frederiksen.

English Abstract of Japanese application 2009124518 (A) published Jun. 4, 2009, Otani Yoshiyuki, p. 1.

* cited by examiner

| | Flop 1 | Flop 2 | Flop 3 | Flop 4 | Level 0 | Level 1 | Level 2 |
|---|---|---|---|---|---|---|---|
| Clk1 | A | - | - | - | - | - | - |
| Clk2 | B | A | - | - | A-B | - | - |
| Clk3 | C | B | A+B | - | - | - | - |
| Clk4 | D | C | A+B | - | C-D | - | - |
| Clk5 | - | D | C+D | A+B | - | (A+B) – (C+D) | A+B+C+D |

| | Flop 0 | Flop 1 | Sel0 | Flop 2 | Flop 3 | Sel1 | Out |
|---|---|---|---|---|---|---|---|
| Clk0 | A+B+C+D | (A+B) – (C+D) | + | - | - | | - |
| Clk1 | A+B+C+D | (A+B) – (C+D) | + | A+B | A-B | + | A |
| Clk2 | A+B+C+D | (A+B) – (C+D) | - | A+B | A-B | - | B |
| Clk3 | A+B+C+D | (A+B) – (C+D) | - | C+D | C-D | + | C |
| Clk4 | - | - | | C+D | C-D | - | D | ly, the words "include", "including", and "includes" mean
STREAMING WAVELET TRANSFORM

BACKGROUND

1. Field of the Invention

This invention is related to the field of compression, and particularly compression for images.

2. Description of the Related Art

Visual images captured and/or displayed by an electronic device are often characterized by a significant memory footprint (i.e. the amount of memory consumed to store data representing the image). As the resolution of the images increases, the memory footprint of the image increases. Various electronic devices are expected to be capable of processing such images. For example, mobile electronic devices such as mobile telephones and personal digital assistants are often equipped with cameras to take still photographs, or even video. While current image capture sensors included in such devices are capable of about 2-4 megapixels, the sensors included in newer phones will continue to increase in resolution. Additionally, such devices are being equipped with higher resolution screens, and thus the footprint of images for display also increases. Such devices may also be designed to output high resolution images/video to an external device, and the footprint of the high resolution images is large.

While the size of memory in such devices is also increasing over time, the size of the memory is not increasing at the same rate as the image size. Additionally, such devices are increasingly providing significant functionality for other purposes. For example, smart phones are beginning to provide multi-threaded processing to support multiple applications executing on the phone concurrently. Each application consumes memory for the code being executed and the data being operated upon, which places further pressure on the memory capacity. Furthermore, the applications compete for access to the memory (e.g. bandwidth), which pressures the interconnect between the memory and the memory controller, and between the memory controller and the other devices in the system such as the processors, graphics devices, display controllers, etc.

Images can be transmitted and stored in compressed form. However, during image capture and display, the time and hardware required to compress and decompress images is often prohibitive. For example, a typical JPEG or H.254 frame may require about 50 clock cycles per pixel and substantial hardware.

Another form of compression includes one or more passes of a wavelet transform on the data. There are a variety of wavelet transforms, and typically multiple passes are used to obtain a desired amount of compression. When implemented in hardware, the designer determines the math that needs to performed in the multiple passes and implements the hardware to perform all of the passes at the same time, in parallel. The implementation can consume significant integrated circuit area, and can be complex and error prone.

SUMMARY

In an embodiment, a compression unit is provided which may perform compression of a pixel stream. Similarly, a decompression unit may be provided which may decompress the compressed pixel stream. The compression and decompression units may include a streaming wavelet transform, which may perform the wavelet transform through a pipeline of wavelet operations. Each section of the pipeline may perform a pass of the wavelet transform on the pixel stream, and the section may provide input to another section of the pipeline that performs a next pass of the wavelet transform. The transform may thus be performed on the fly as the pixels are received, and may simplify the implementation of the transform. In some embodiments, the implementation may be efficient in terms of integrated circuit area consumed, power consumption, etc.

BRIEF DESCRIPTION OF THE DRAWINGS

The following detailed description makes reference to the accompanying drawings, which are now briefly described.

Figure 1:
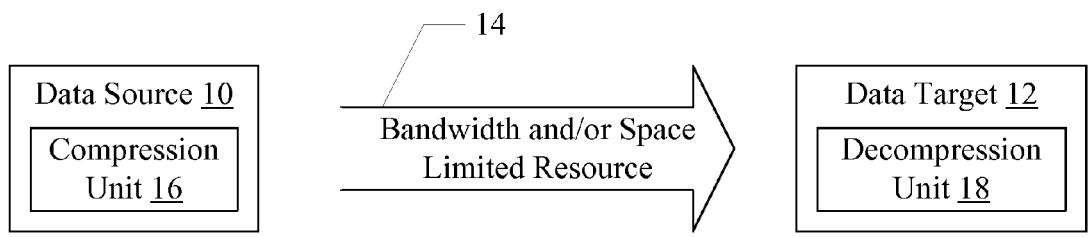
FIG. 1 is a block diagram of one embodiment of a generic data source and data target using compression and decompression.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not intended to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/ circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/ component.

DETAILED DESCRIPTION OF EMBODIMENTS

Embodiments of wavelet transformation and inverse wavelet transformation are described below in the context of image data compression and decompression. However, any type of data may be compressed/decompressed using the wavelet transformation techniques described below. Furthermore, wavelet transforms may be used in many other applications of signal processing, data analysis, etc. The wavelet circuitry described herein may be used in any such application.

Compression Overview

Turning now to FIG. 1, a block diagram is shown of a generic data source 10 and a generic data target 12 coupled via a channel 14 that includes at least one bandwidth-limited and/or space-limited resource. The data source 10 includes a compression unit 16, and the data target 12 includes a decompression unit 18.

Generally, the data source 10 may be configured to transfer data over the channel 14 to the data target 12. The data source 10 may generate the data (e.g. the data source 10 may be a sensor, such as a camera for graphical images), or may receive the data from other circuitry and may optionally process the data to transform the data in some defined fashion. The data source 10 may then compress the data using the compression unit 16. Generally, the compression may itself be a transformation of the data, reducing the size of the data in the transformation.

Compression may be lossless or lossy. With lossless compression, the original data may be recovered in its exact form after compression and subsequent decompression. Accordingly, lossless compression algorithms may focus on removing redundancy in the original data and encoding the data more efficiently, but in a fashion that retains all information content. For example, a long consecutive string of the same value in the data can be replaced with a more efficient coding such as a count of the number of instances of the value followed by one instance of the value itself. In lossy compression, the decompressed data (resulting from compressing the original data and decompressing the compressed data) is an approximation of the original data. Particularly with graphical images, lossy compression may produce decompressed images that are virtually indistinguishable from the original image when viewed by the human eye, even though the decompressed images have lost some of the content that represents the image. Alternatively, lossy compression may result in decompressed images having noticeable differences from the original image, but the differences may be considered acceptable to the viewer.

By compressing the data and transferring the compressed data over the channel 14, the data source 10 may consume less of the available bandwidth and/or storage space in the channel 14. For example, the channel 14 may include one or more interconnects over which the data is transmitted. Each interconnect may have a maximum bandwidth, and at least some of the interconnect bandwidths may be insufficient to support transmission of the uncompressed data in "real time." That is, the uncompressed data may be generated or received by the data source 10 at a particular rate. If the bandwidth available to the data source 10 is less than the rate, then the uncompressed data cannot be transmitted without stalling, or back-pressuring, the data generation/receipt rate. In some cases, it may not be acceptable to stall the data generation/receipt rate. For example, if the data source 10 is a camera sensor, the data representing an image must be transmitted before the sensor captures the next image. If the data source 10 is providing video, the images are being transmitted at a particular frame rate and stalling leads to lost frames.

In addition to bandwidth limitations, space limitations may present issues to transmitting the uncompressed data. For example, the channel 14 may include local memory buffers and/or a main memory system in the device that includes the data source 10 and the data target 12. The size of the data in memory (its "footprint") may consume all of the available memory, or a sufficiently large portion of the memory that other data is crowded out of the memory.

Even in cases in which the bandwidth and space characteristics of the channel 14 are sufficient to handle the uncompressed data, higher performance in the system overall (in which other activities are being performed beyond the transfer of data from the data source 10 to the data target 14 which may need access to the channel 14) may be achieved by reducing the load of the data source 10 on the channel 14.

The decompression unit 18 is configured to reverse the operation of the compression unit 16, producing the original uncompressed data or an approximation thereof. That is, the decompression unit 18 is designed with an awareness of the compression algorithm used by the compression unit 16. Additionally, if parameters of the compression algorithm are programmable, both the compression unit 16 and the decompression unit 18 are programmed in the same fashion to ensure that the decompression unit 18 properly interprets the received data.

In the case of image data, the frame of data that represents the image has a spatial relationship. The frame of data may, for example, represent the colors of a set of pixels arranged in a two dimensional format. Within a frame, a tile may be defined which includes a subset of the pixels. The size of the tile, e.g. the number of pixels, may be configurable. One implementation of the compression unit 16/decompression unit 18 may provide good compression ratios with good image results for about 1000 to 2000 pixels per tile. Thus, for example, tiles of 32 pixels horizontal by 32 pixels vertical (32×32) may be defined and such tiles include 1024 pixels. Additionally, the shape of the tile may be varied in various embodiments. For example, square or rectangular tiles may be defined. Thus, a 1024 pixel tile may be 32×32, 64×16, 128×8, 256×4, etc. In tile-based implementations, each tile may be compressed as a unit and the compressed tile may be transmitted and decompressed. In another implementation, good compression results may be achieved with smaller tiles (e.g. 64 pixel tiles, in a 16×4 arrangement). Larger tiles may also be used (e.g. tiles with more than 2000 pixels) in other implementations.

Applying the compression algorithm to a tile of data may include one or more transforms applied to the data, transforming the data into a form in which at least some of the transformed data becomes zero or near-zero. For example, in one embodiment, one or more wavelet transforms may be used. In one implementation, a Haar wavelet may be applied with the coefficients [1], [1]. In another implementation, multiple wavelets may be applied in succession, including for example: Deslauriers-Dubuc (9,7) with the coefficients [1,1], [−1,9,9,−1]; LeGall (5,3) with the coefficients [1,1],[1,1]; Deslauriers-Dubuc (13,7) with the coefficients [−1,9,9,−1],[−1,9,9,−1]; and Haar with the coefficients [1],[1]. With coefficients of one and nine, and treating nine as one and eight, there may be no need for multipliers in the compression unit 16 and decompression unit 18. That is, the computations may be performed using shifters and adders.

The data resulting from transforming the uncompressed data via one or more transforms are referred to as coefficients. A coefficient may have an associated significance, based on the magnitude of the coefficient with respect to zero. For example, the coefficients resulting from the wavelet transformations discussed above may be positive signed integers. Accordingly, the most significant set bit in the coefficient may be viewed as a measure of significance of the coefficient. Coefficients have their most significant set bits in the same bit position may be referred to as a significance group. A first coefficient may be referred to as more significant than a second coefficient if the first coefficient has its most significant set bit in a more significant bit position than the bit position in which the second coefficient has its most significant set bit. Alternatively, both positive and negative signed integers may be included in the coefficients. In such a case, the most significant set bit may indicate the significance group if the integer is positive (sign bit is zero). If the integer is negative (sign bit is one), two or more most significant bits may be set. The coefficients having the same field of most significant set bits may be included in the same significance group in such embodiments.

The compression unit 16 may order the coefficients according to the areas of data most likely to have significant coefficients, resulting in an ordered list. The compression unit 16 may then scan the ordered list, searching for the most significant coefficients (i.e. those coefficients having the most significant bit set) and may transmit the most significant coefficients to the data target 12. Additionally, during the scan, the compression unit 16 may generate linked lists of coefficients for each other significance group. That is, for each bit in the coefficients, a linked list may be generated with pointers to the coefficients having that bit as the most significant set bit, thus forming the significance groups as the members of each linked list. Accordingly, each coefficient may be included in only one significance group.

In this manner, the list of coefficients may only be scanned in full one time. The linked list of coefficients for each other significance group may be traversed, limiting the visiting of each remaining value to one time. Thus, the number of scans through the list is less than two, and may be close to one. For example, about 1¼ scans of the list may be sufficient to send all coefficients, in an embodiment. Specifically, in one embodiment, the more significant coefficients may be clustered in one area of the compressed tile, with other significant coefficients appearing in small numbers in the other areas.

A coefficient may be "sent" by the compression unit 16 by sending a location of the coefficient followed by the value of the coefficient (e.g. as a signed integer). For example, the address of the coefficient in the coefficient list may be sent as the location (or the difference in the address from the previously-sent address, referred to herein as a "delta address", for each coefficient after the first coefficient). Other embodiments may identify the location in other ways (e.g. as a pixel address within the tile or within the image). In one embodiment, the coefficient list delta address may be transmitted using an exponential coding such as the exponential Golomb code. An exponential Golomb code sends small magnitude numbers (near zero) efficiently but higher magnitude numbers inefficiently. Accordingly, since the coefficient list delta address is small, the exponential Golomb code may send the addresses efficiently.

For example, an exponential Golomb code may be defined as follows: An exponential-Golomb code of order k is a type of universal code parameterized by a whole number k. To encode a nonnegative integer in an order-k exponential-Golomb code, one can use the following method: (1) Take the number in binary except for the last k digits and add 1 to it (arithmetically); (2) Count the bits from step (1), subtract one, and begin the code with that number of starting zero bits preceding the previous bit string; (3) code the last k bits in binary. For example, if k=0 the code begins:

```
0 => 1 => 1
1 => 10 => 010
2 => 11 => 011
3 => 100 => 00100
4 => 101 => 00101
5 => 110 => 00110
6 => 111 => 00111
7 => 1000 => 0001000
8 => 1001 => 0001001
etc.
```

In one embodiment, the compression unit 16 may be configured to convert the initial binary two's complement representation of the coefficients to signed magnitude coefficients. The most significant coefficients are sent initially, followed in order by the less significant coefficients until all coefficients are sent or until transmission is terminated early due to lack of space (e.g. in a receiving buffer) or time. In an embodiment, the most significant bit of the coefficient value is not sent since it is always a one. The remaining bits may be sent for each coefficient value. In an embodiment, the sign bit may be sent for each coefficient value when one exists. However, in the exemplary embodiment using wavelet transforms, the sign bit does not exist for coefficients in the LL plane. Alternatively, negative coefficient values may be sent as a separate significance group. For example, in an embodiment, the negative significant group may be sent after (or before) the equivalent significance group of positive values. In such an embodiment, the sign may be implicit.

After the initial coefficient is sent, the delta address to the next most significant coefficient may be sent followed by that coefficient. As mentioned above, the delta address may be the difference between the previous coefficient address and the current coefficient address. In one embodiment, the delta address may be the difference between the previous coefficient address and the current coefficient address, minus one. In such an embodiment, the delta address for adjacent coefficients is zero. Thus, by clustering coefficients of the same significance group in the coefficient list, the delta address may frequently be zero. Accordingly, the delta address may generally be zero or a small positive number, which may be encoded efficiently in the exponential Golomb code. The transmission of delta addresses and coefficient values may continue until all of the coefficients in the current significance group have been sent. The end of the significance group may be signalled to the decompression unit 18 in some fashion. For example, the end of the significance group may be signalled by sending a last delta address that points to an address beyond the length of the coefficient list. Alternatively, the delta address may be calculated as a delta address, modulo the length of the coefficient list, to the initial coefficient of the next significance group. The decompression unit 18 may be configured to detect the rollover from the end of the list to the beginning of the list again, and thus may detect that the next significance group is starting. Such an embodiment may avoid sending two addresses, one to terminate the significance group and one to start the next significance group. The remaining coefficients in other significance groups may be sent in a similar fashion until all non-zero coefficients are sent. Any coefficient not sent may be assumed to be zero by the decompression unit 18.

The decompression unit 18 may be configured to receive the compressed data. If the decompression unit 18 receives the data over a communication channel directly from the compression unit 16 without being stored in a memory system as a whole, the decompression unit 18 may be configured to assemble the data into the compressed image. The decompression unit 18 may be configured to apply the inverse of the wavelet transforms in reverse order of their application to restore the original image data (or an approximation thereof).

While the embodiment of FIG. 1 shows a data source and a data target with respective compression and decompression units, there may be multiple sources that compress data, and there may be multiple targets that decompress data. Data may be decompressed, manipulated, and compressed again in various circuitry.

Figure 2:
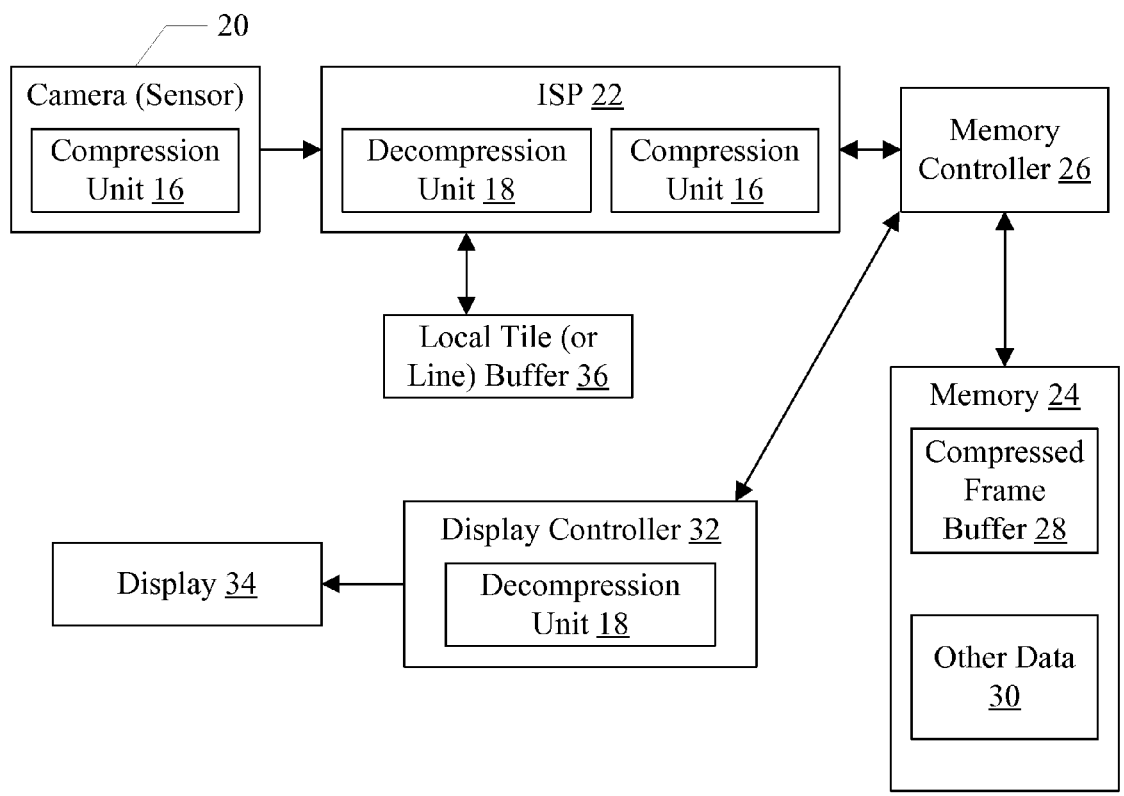
FIG. 2 is a block diagram of a more detailed embodiment using compression and decompression.

FIG. 2 is a more detailed embodiment of a system that may employ compression and decompression units. In the embodiment of FIG. 2, a camera sensor 20 is shown including an instance of the compression unit 16 and transmitting the compressed data to an image signal processor (ISP) 22, which includes an instance of the decompression unit 18 and an instance of the compression unit 16. The ISP 22 may be configured to transform the camera sensor data and to compress the transformed data to be written to a memory 24 through a memory controller 26. The transformed data is illustrated as the compressed frame buffer 28. The memory 24 may store other data 30 as well. For example, data 30 may include one or more of the following: instructions to be executed on a processor, application data for applications being executed in the system, other images, etc. The compressed frame buffer 28 may be read through the memory controller 26 by a display controller 32, which may include an instance of the decompression unit 18. The display controller 32 may be coupled to a display 34. In various embodiments, one or more of the components illustrated in FIG. 2 may be integrated together on an integrated circuit (and other components, not shown, may be integrated on the integrated circuit as well). For example, in embodiment includes the ISP 22, the memory controller 26, and a portion of the display controller 32 integrated onto the integrated circuit. The other components may be included in a system with the integrated circuit. For example, the system may be a mobile device such as a cellular telephone, smart phone, personal digital assistant, or tablet computer in various embodiments. Other embodiments may be other types of digital systems such as laptops, desktops, or net tops.

The camera 20 may be any type of image sensor. The output of the camera 20 may be a set of pixels sensed by the camera 20, forming an image. The image may not yet have been processed for sensor saturation compensation or other compensation and/or enhancement. The camera 20 may include the compression unit 16, which may be configured to compress the sensed image and transmit the compressed image to the ISP 22. The ISP 22 may be configured to decompress the sensed image in the decompression unit 18, perform the desired image compensation and/or enhancement, and compress the resulting image in the compression unit 16 to be transmitted to the memory controller 26. In some embodiments, the ISP 22 may implement a local tile (or line) buffer to store decompressed frame data for processing and compression. If the buffer 36 is a tile buffer, one or more tiles may be retained in the tile buffer for manipulation and subsequent update to memory. If the buffer 36 is a line buffer, one or more lines of an image may be retained. The ISP 22 may decompress, process, compress, and transmit on a tile-by-tile (or line-by-line) basis as the compressed tiles are received from the camera sensor 20. In one embodiment, the camera sensor 20 and the ISP 22 may operate on scan lines of images, and thus a wide (horizontal), short (vertical) tile may be used (e.g. 128×8 or 256×4). In some embodiments, the ISP 22 may perform some processing prior to decompression (e.g. while the image data is still in wavelet space). For example, embodiments may perform binary scaling, noise reduction, and/or defective pixel correction prior to decompression.

The memory controller 26 may be configured to receive write operations from the ISP 22, and to write the compressed data to the compressed frame buffer 28. In an embodiment, the compressed frame buffer 28 may be smaller than a full size frame buffer that would be capable of storing the uncompressed frame. In another embodiment, the full size frame buffer may be allocated but may store the compressed data. It is statistically possible, but unlikely, that the losslessly compressed data could be larger than the full-size tile data. In this case, the system may mark (or flag) the tile and store the original uncompressed data. Any mechanism for flagging the tile may be used (e.g. saving the address of such a tile). Lossy compressed data may be made to fit in the allocated space by accepting additional loss in the data. Generally, the memory controller 26 may be configured to couple to a high level interface such as a bus or point-to-point interconnect to receive read and write memory operations, and may be configured to communicate on a lower level interface to the memory devices forming the memory 24. The memory 24 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with an integrated circuit including the memory controller 26 in a chip-on-chip configuration, a package-on-package configuration, or a multi-chip module configuration.

The display controller 32 may be configured to read the compressed frame buffer 28 to display the frame on the display 34. The display controller 32 may thus include the decompression unit 18 to decompress the compress frame buffer data. The display controller 32 may include circuitry configured to blend image data from multiple frames to produce a frame for display. The display controller 32 may further include the interface hardware to interface with the display 34. The display 34 may include any type of display screen (e.g. liquid crystal display (LCD), cathode ray tube (CRT), thin film transistor (TFT), plasma display, etc). The display 34 for a mobile device may include touch screen functionality.

It is noted that other devices in the system may operate on image data and may implement the compression/decompression units 16 and 18. For example, graphics controllers may be included to render a scene for display. The rendered frame may be compressed for storage in the memory 24 and decompressed for display. Any circuitry which operates on images may use the compression described herein, as may any other type of data that is amenable to compression.

In an embodiment, the use of compression on the image data may permit the local tile/line buffer 36 to be integrated on an integrated circuit with the ISP 22 and other components. That is, the size of the local tile/line buffer 36 to store compressed tiles or lines may be small enough for integration where a local buffer to store uncompressed data may be too large for integration. The latency for accesses to the local tile/line buffer 36 may be lower than accesses to an off-chip memory, which may improve performance of the system in processing images.

Figure 3:
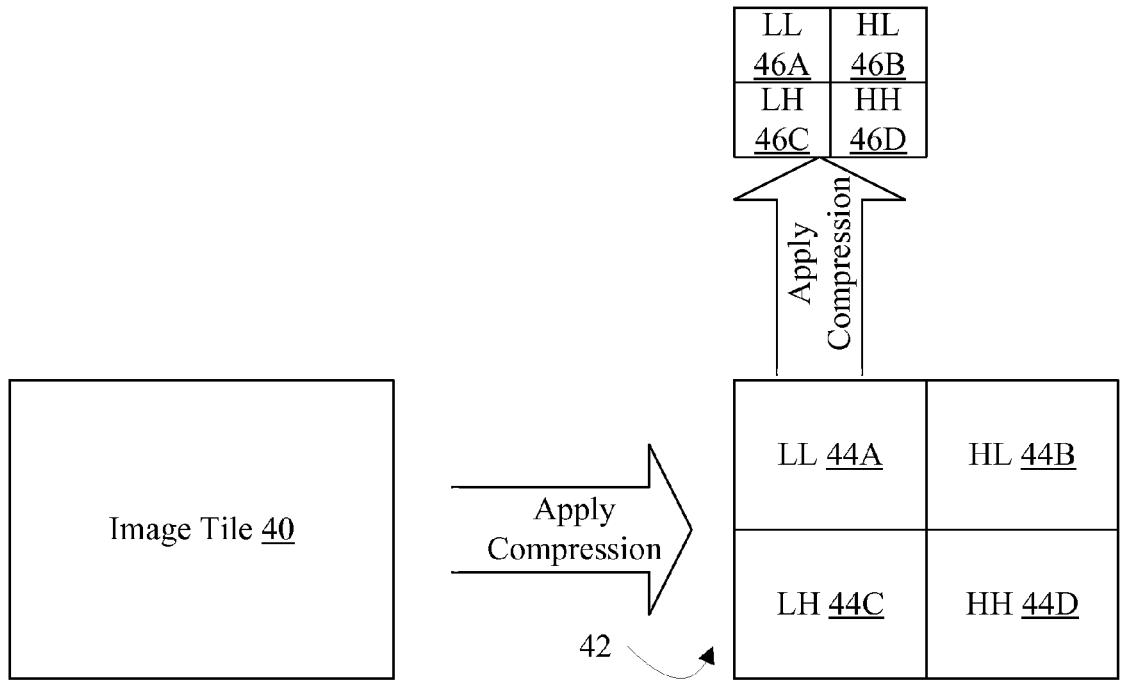
FIG. 3 is a block diagram illustrating one embodiment of an image tile being compressed.
Figure 4:
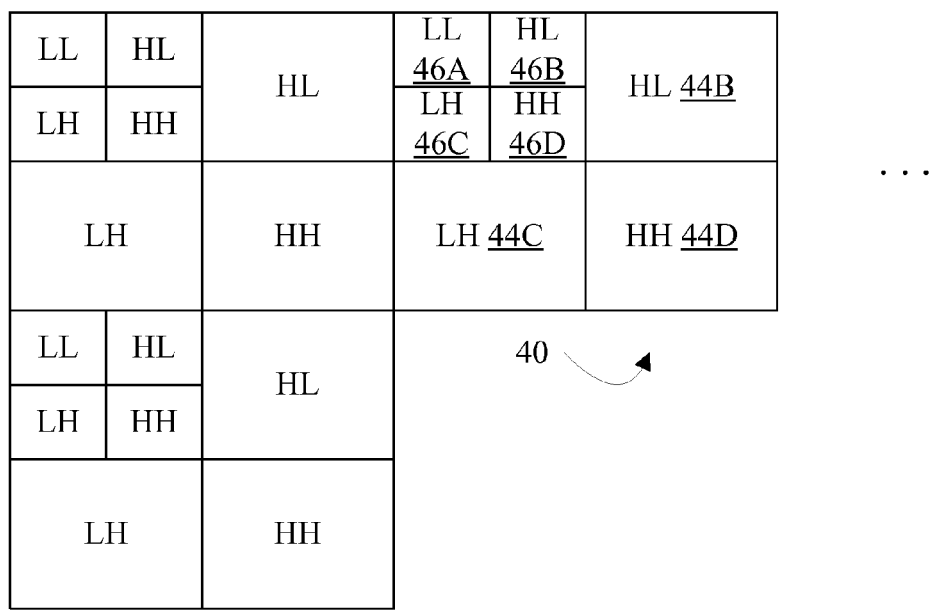
FIG. 4 is a block diagram illustrating multiple tiles of an image.

FIGS. 3 and 4 illustrate compression of tiles in an image according to one embodiment of the compression units 16. FIG. 3 is a block diagram of one embodiment of an image tile 40. Applying a transformation (e.g. a wavelet) to the image tile 40 may produce a transformed tile 42. The transformed tile 42 is divided into 4 quadrants 44A-44D labeled LL, HL, LH, and HH, respectively. The LL quadrant 44A may generally have the most significant coefficients. The HL, LH, and HH quadrants 44B-44D may be sparsely populated with significant coefficients, typically corresponding to pixels that form an edge between colors in the image. Remaining coefficients in these quadrants are typically zero or near zero. The HH quadrant 44D may tend to be the most sparsely populated with significant coefficients. The L and the H may generally refer to low frequency components and high frequency components in the transformation. The first "L" or "H" refers to the horizontal direction and the second "L" or "H" refers to the vertical direction.

The transformation may be applied again to the quadrant 44A, producing quadrants 46A-46D. Similar to the quadrants 44A-44D, the quadrants 46A-46D are labeled LL, HL, LH and HH respectively. The transformation of the LL quadrant resulting from a previous application of a transformation may be repeated as often as desired. At some point, the HL, LH, and HH quadrants become less sparsely (more densely) populated with significant coefficients. Accordingly, the number of iterations of applying the transformation may be capped based on the reduced compression return that additional iterations would provide. A cap of 4 iterations may be chosen, in an embodiment, although more or fewer iterations may be used in other embodiments. The number of iterations may also be varied dynamically based on the number of significant coefficients that appear in the HL, LH, and HH quadrants after each iteration.

While FIG. 3 separately illustrates the image tile 40, the transformed tile 42, and the transformed quadrant 44A (as the quadrants 46A-46D), the transformation may be performed within the same memory locations, overwriting the original data in the tiles. FIG. 4 illustrates several tiles including tile 40. The tiles may be part of a overall image. The original tile 40 has been replaced by the transformed tile 42, including the quadrants 44B-44C. The quadrant 44A has been replaced by its transformed representation (quadrants 46A-46D). Other tiles may similarly be replaced with their transformed representations.

Figure 5:
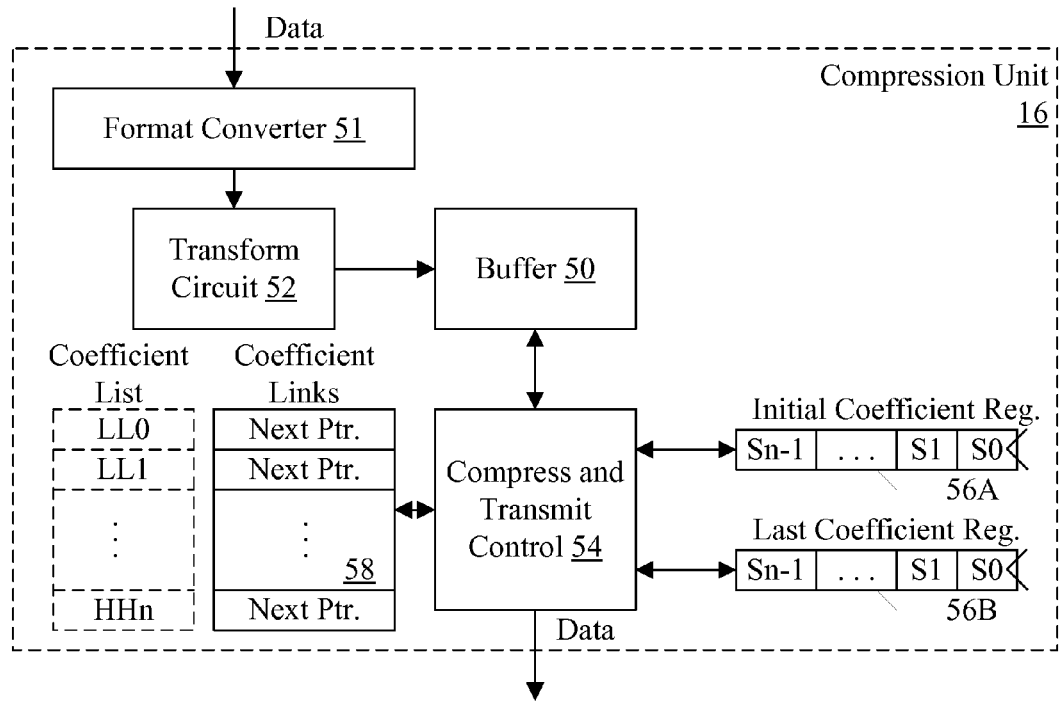
FIG. 5 is a block diagram of one embodiment of a compression unit.

Turning now to FIG. 5, a block diagram of one embodiment of the compression unit 16 is shown. In the embodiment of FIG. 5, the compression unit 16 includes a data buffer 50, a format converter circuit 51, a transform circuit 52, a compression and transmit control circuit 54, coefficient pointer registers 56A-56B and coefficient links memory 58. The transform circuit 32 is coupled to receive data to be compressed (e.g. a tile of data), which may be transformed through the format converter circuit 51 in some embodiments, and is coupled to the buffer 50. The buffer 50 is further coupled to the compression and transmit control circuit 54. The compression and transmit control circuit 54 is coupled to provide compressed data for transmission, and is coupled to the coefficient links memory 58 and the coefficient pointer registers 56A-56B. Each of the registers 56A-56B may include several fields, labeled S0 to Sn−1 in FIG. 5 (where n is the number of bits in a coefficient). The field may store a pointer to an entry in the coefficient links memory 58 having a coefficient of the corresponding significance. For example, the most significant coefficient pointer is in the field Sn−1. The second least significant coefficient pointer is in the field S1, and the least significant coefficient pointer is in the field S0. The registers 56A-56B may include one or more registers as needed to provide storage for the pointers.

Each entry in the coefficient links memory 58 corresponds to a coefficient in the list of coefficients that form the compressed image. The list may be ordered beginning with the LL quadrant of the innermost compression (and with a predefined order of the LL coefficients within the quadrant, such as row-major or column-major) and proceeding through the other quadrants of each compression from innermost to outermost, reaching the HH quadrant of the outermost compression. The list is illustrated in dotted form next to the coefficient links memory 58 in FIG. 5 to represent the logical organization of the list. However, the coefficient list may physically be stored in the buffer 50 after the transformations performed by the transform circuit 52 have overwritten the original data with the transformed data, e.g. as illustrated in FIG. 4.

The format converter circuit 51 may optionally be configured to convert a format of the input data to the compression unit 16. For example, in one embodiment, the image data may be provided in red-green-blue (RGB) format. In RGB format, each pixel is represented as a red color value, a green color value, and a blue color value. For example, eight bits of each value may be provided, and thus a pixel may be represented by 24 bits. Other embodiments may implement other sizes for the color values. The RGB representation may be compressed (effectively compressing 3 images: one red, one green, and one blue). Alternatively, by converting to a different format, the compression efficiency of some images may be increased. For example, a YUV format may be used in one embodiment discussed in more detail below. It is noted that the transformation from RGB to YUV is optional and may not be used in other embodiments.

The transform circuit 52 may be configured to transform the data. The transform circuit 52 may be configured to apply several transform algorithms in succession (e.g. several wavelet transformations may be applied, as discussed above). Thus, there may be multiple passes of wavelet transformations to apply the different algorithms. Alternatively, multiple passes of the same transform may be applied to further reduce the low frequency components (e.g. as shown in FIGS. 3 and 4). The transform circuit 52 may be configured to operate in a streaming fashion on the input data. That is, a stream of input pixels corresponding to a tile may be received, and the wavelet transforms may be applied to the stream of pixels as the stream arrives. More particularly, the transform circuit 52 may include multiple pipelines. Each pipeline may include multiple sections, and each section may apply the wavelet transform to two or more pixels in that section. Each section may feed another section to apply another pass of the transform. Outputs from each section may be the output coefficients for the transform. One of the pipelines may perform the passes of the transform in one dimension for the tile (e.g. horizontal or vertical), and the another one of the pipelines may perform the transform in the other dimension. Additional details are provided below for some embodiments.

The transform circuit 52 may be configured to write the resulting coefficients to the buffer 50. The compression and transmit control circuit 54 may be configured to scan the coefficients in the buffer and transmit the coefficients (i.e. the compressed data). More specifically, the compression and transmit control circuit 54 may be configured to order the coefficients to create the coefficient list. The list may not be physically created by changing the order of the data in the data buffer 50, but rather the list may be created virtually be controlling the generation of addresses when scanning through the list so that the correct coefficients are addressed in the data buffer 50. Specifically, the list may be ordered by selecting the coefficients in the LL quadrant of the innermost transformation, followed by the HL, LH, and HH quadrants. The HL, LH, and HH quadrants of the next innermost transformation may be selected, etc. until the HL, LH, and HH quadrants of the outermost transformation are selected. For example, in the image tile 40 shown in FIG. 4, the coefficients from the LL quadrant 46A may appear in the coefficient list first, followed by the coefficients from the HL quadrant 46B, the LH quadrant 46C, and the HH quadrant 46D. The coefficients from the HL quadrant 44B, LH quadrant 44C, and HH quadrant 44D may follow the coefficients from the quadrants 46A-46D in the list.

The compression and transmit control circuit 54 may be configured to scan the list searching for the most significant coefficients, and may also be configured to build a linked list of coefficients in other significance groups. That is, the compression and transmit control circuit 54 may be configured to search for coefficients having the most significant bit set (or most significant bits, for negative coefficients). Additionally, for each coefficient that is not in the most significant group, the compression and transmit control circuit 54 may be configured to identify the significance group for that coefficient and may be configured to add that coefficient to the linked list for that significance group. The coefficient links memory 58 may be used to store the pointers from each coefficient to the next coefficient in the list that is in the same significance group. That is, there may be an entry in the coefficient links memory 58 for each coefficient in the tile, and the entry may store a pointer to another entry in the list. The pointers may be referenced from the top of the list, and thus a number of bits in the pointer is controlled by a number of coefficients in the compressed data (e.g. 10 bits in the embodiments that include 1024 pixels per tile, 11 bits if 2048 pixels per tile are included, etc.). The initial coefficient pointer register 56A may store pointers to the initial coefficients in the list for each significance group, and the last coefficient pointer register 56B may store pointers to the most recently detected coefficient of each significance group in the list.

Once the first pass through the list of coefficients is complete, the most significant coefficients have been transmitted and the linked lists for each other significance group have been created. The compression and transmit control circuit 54 may be configured to select each significance group in turn and to traverse the linked list to transmit the other coefficients from the other significance groups.

It is noted that, by processing the coefficients from most significant to least significant as discussed above, it may be possible to perform lossy compression by terminating the sending of coefficients when the significance reduces below a threshold. That is, the significant coefficients have been transmitted prior to the termination, ensuring that the loss is maintained below a desired level. Similarly, transmission may be terminated when the total amount of data sent fills the space allocated for the compressed tile.

It is noted that the present embodiment may not send the coefficients that are equal to zero. Accordingly, a tile may be initialized to zero and then filled with the non-zero coefficients sent from the compression unit 16. The resultant tile (with zero coefficients in positions of the tile for which the compression unit 16 did not send data) may reproduce the original compressed tile, which may then be decompressed to produce the original tile.

Wavelet Transforms

Figure 6:
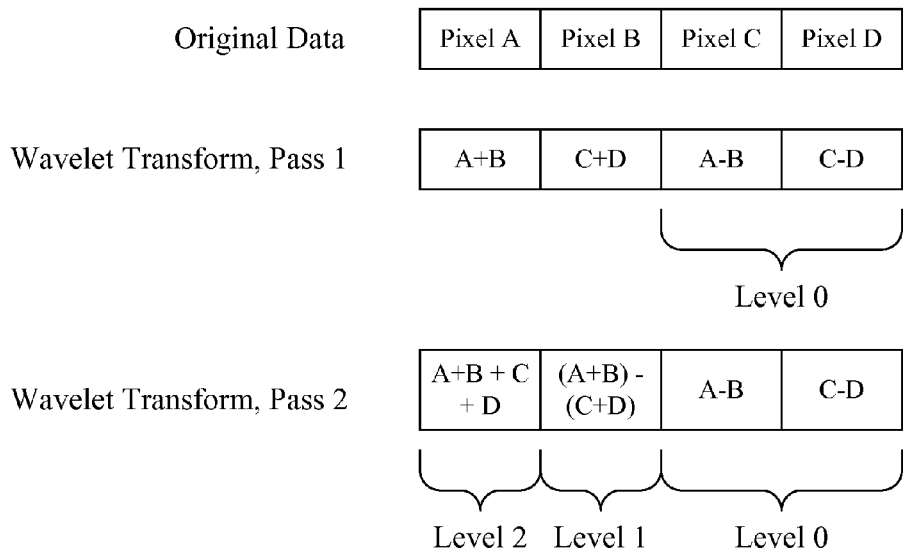
FIG. 6 is a block diagram illustrating operation of one embodiment of a transform circuit shown in FIG. 5.

FIG. 6 is a block diagram illustrating an exemplary 4 pixel tile and performing two passes of a wavelet transform on the pixels to illustrate the pipelines to perform the transforms. The number of pixels in a tile, and the arrangement of the tile horizontally and vertically (e.g. rows and columns) may be larger than that shown in FIG. 6. For example, a tile may be 128×1, 128×2, 16×16, etc. Any tile size and configuration may be selected. An example wavelet transform that operates on two pixels at a time, taking sums and differences of the pixels to produce the components of the transform, is shown in the attached in FIG. 6. Accordingly, the first pass of the wavelet transforms takes sums and differences of adjacent pixels, placing the sums on the left as shown in FIG. 6 and the differences on the right. The differences are the high frequency components, in this embodiment, and are labeled level 0 in FIG. 6. A second pass of the wavelet transform may be applied on the sums, producing the level 1 and level 2 outputs shown. Other wavelet transforms may operate on more than 2 pixels to produce an output pixel.

Figures 7, 8:
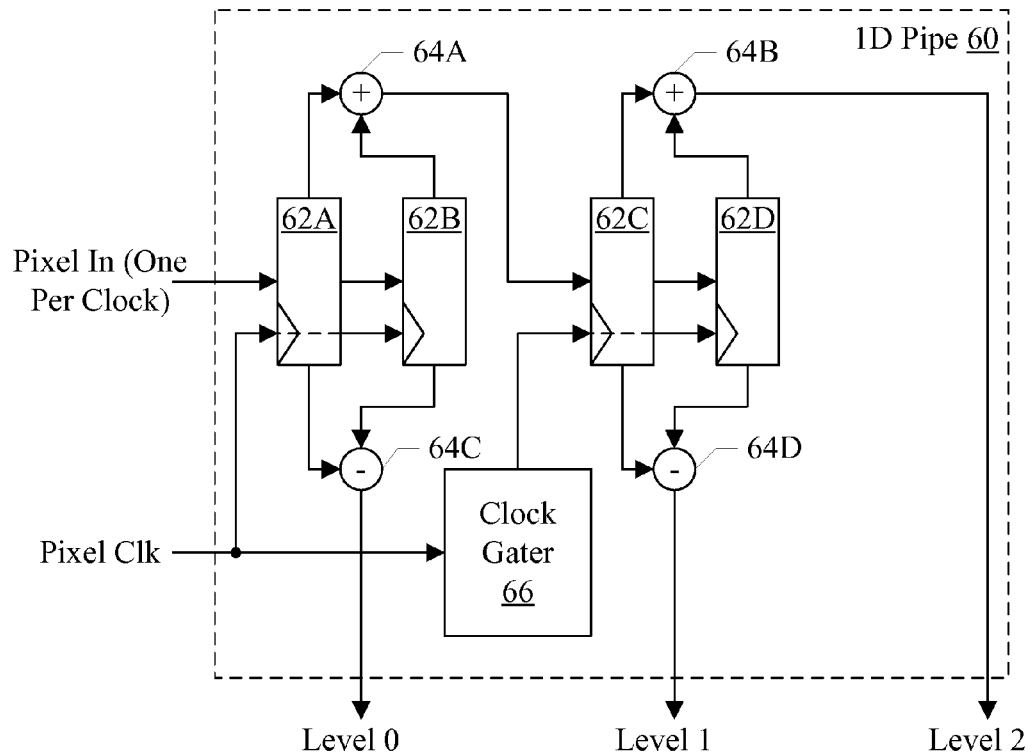
FIG. 7 is a circuit diagram of one embodiment of a pipeline that may be implemented in embodiments of the transform circuit
FIG. 8 is a table illustrating operation of one embodiment of the pipeline shown in FIG. 7.

FIG. 7 is a block diagram of one embodiment of a pipeline 60 which may receive a stream of input pixels and perform multiple iterations of a wavelet transform on the pixel stream to complete the transform in one dimension for the tile. In the illustrated embodiment, a series of clocked storage devices (e.g. flops, registers, latches, etc.) 62A-62D and corresponding circuitry 64A-64D is shown. The clocked storage devices will be referred to as flops for one example, but may be any type of clocked storage device.

The flops 62A-62B are serially connected, and corresponding circuitry 64A and 64C is coupled to the outputs of the flops 62A-62B. Together, the flops 62A-62B and the circuitry 64A and 64C may form a section of the pipeline 60. Similarly, the flops 62C-62D and the circuitry 64B and 64D may form a second section of the pipeline 60. the first section is fed by the input pixel stream, one pixel per clock of a corresponding pixel clock that clocks the flops 62A-62B. The second section is coupled to receive coefficients generated by the first section. The clock to the flops 62C-62D in the second section may be gated by a clock gater circuit 66 that is coupled to receive the pixel clock as well. Generally, the clock gater circuit 66 may enable the clock to the second section when the first section is outputting a valid coefficient to the second section. In the illustrated embodiment, the first section has a length of two and thus produces a valid coefficient every other clock cycle. Accordingly, the clock gater circuit 66 may enable the clock every other clock cycle. Other embodiments may have longer sections, and the pattern of enabling the clock may be different. Viewed in another way, the pattern of clock enables for a section may be responsive to the length of the preceding section or sections.

Each section of the pipeline may perform one pass of the wavelet transform. Accordingly, the number of flops in each section and the corresponding circuitry in each section may depend on the definition of the transform. That is, if the transform is defined to operate on N input values to generate a coefficient, the length of each section is N. In the illustrated embodiment, the transform is implemented by taking the sum (circuit 64A) and the difference (circuit 64C) of adjacent pixels. Other embodiments may also scale one or more values being operated upon (e.g. multiplying or dividing the value). In an embodiment, multiplying and dividing may be implemented at a power of two (or the sum of power of two numbers) and thus the scaling may be accomplished by shifting. The number of sections may be equal to the number of passes through the transform. For additional passes, the pattern of clock enables would also change. For example, a third pass would be enabled every fourth clock cycle in this example (because two coefficients are shifted into the second section before the level two output is valid). As FIG. 7 illustrates, the amount of hardware implemented to perform the transform may be relatively small and efficient.

The difference output (circuit 64C) from the first section may be the level zero output illustrated in FIG. 6. The sum output (circuit 64A) generates a coefficient for the second section, and the difference output of the second section (circuit 64D) is the level one output illustrated in FIG. 6. The sum output of the second section (circuit 64B) is the level two output.

Based on the exemplary transform shown in FIG. 6, FIG. 8 illustrates an example of the contents of each flop 62A-62D and the level zero to level two outputs over a series of clock cycles. In FIG. 8, flop 1 is flop 62A; flop 2 is flop 62B; flop 3 is flop 62C; and flop 4 is flop 64D. Clock cycles are listed on the left of FIG. 8, with time progressing in the downward direction.

In clk1, flop 1 captures pixel A from the pixel stream and there is not yet a valid output. In clk2, flop 2 captures pixel A from flop 1 and flop 1 captures pixel B from the pixel stream. The first coefficient for the second pass (A+B) is generated and captured by flop 3 in clk3. Accordingly, the clock to the second section is enabled in clk2. In clock clk3, flop 1 captures pixel C from the pixel stream and flop 2 captures pixel B. There is no valid coefficient, so the clock to flops 3 and 4 is gated. In clk4, pixel D is captured by flop 1 from the pixel stream and pixel C is captured by flop 2. The difference C−D is thus generated, and C+D is captured by flop 3. Thus, the clock is enabled to the second section in clk4. Flop 4 captures A+B from flop 3 as well, and the coefficients for levels 1 and 2 may be generated as illustrated in clk5.

Figure 9:
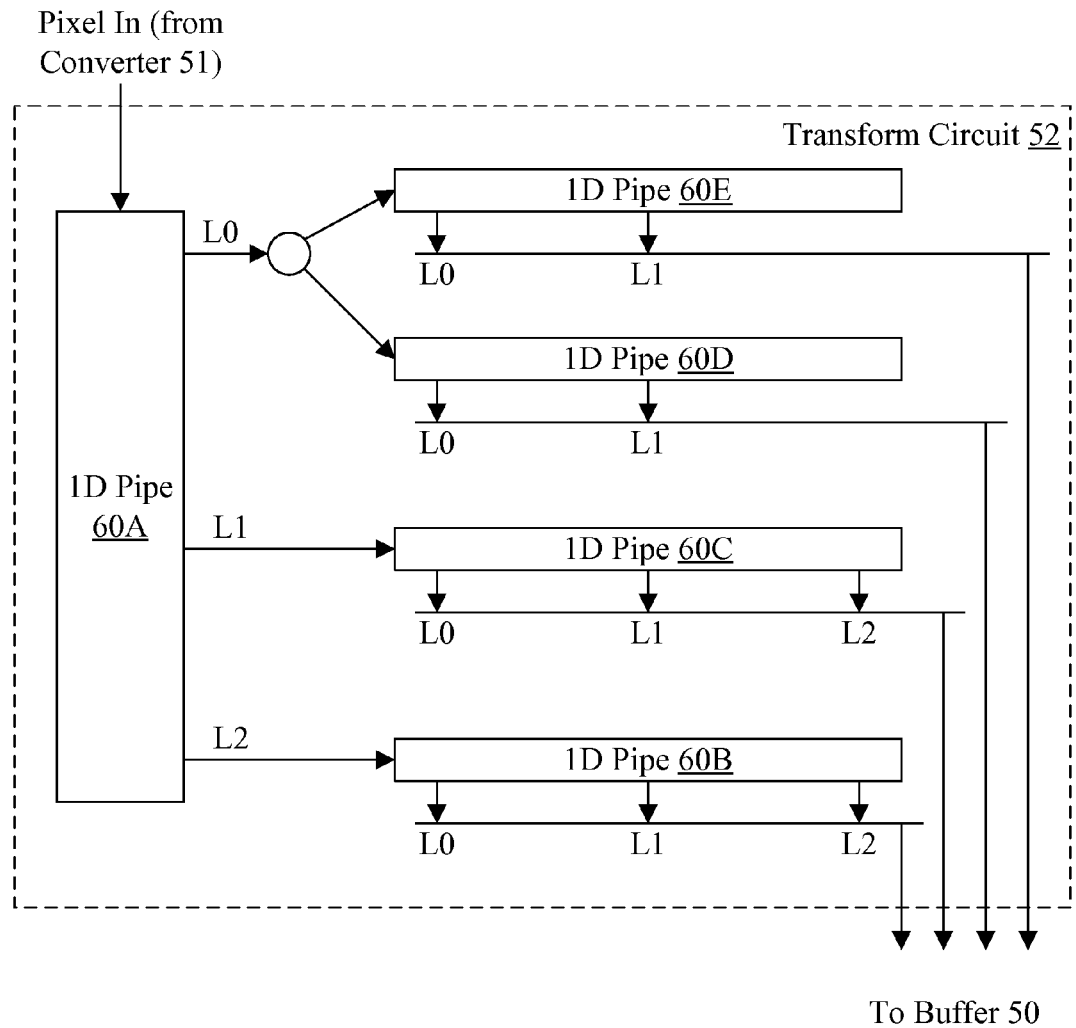
FIG. 9 is a block diagram illustrating multiple instances of the pipeline shown in FIG. 7 forming an embodiment of the transform circuit shown in FIG. 5.

Turning now to FIG. 9, a block diagram illustrating one embodiment of the transform circuit 52 is shown implementing multiple instances of the pipe 60 to perform a wavelet transform on a tile of image data. Particularly, the embodiment of FIG. 9 includes a first instance of the pipe 60A coupled to receive the input pixel stream from the converter 51 and configured to generate the level zero through level two outputs as described previously. The level two output is coupled to a second instance of the pipe 60B and the level one output is coupled to a third instance of the pipe 60C. The level zero output is coupled to two instances of the pipe 60D and 60E. The outputs of the pipes 60B-60E form the outputs to be written to the buffer 50.

In the illustrated embodiment, the pipe 60A may apply the transform in the vertical direction of the tile, and the pipes 60B-60E may apply the transform in the horizontal direction for each row of the tiles. The output of the pipe 60E may be the lowest row of the tile, as illustrated in FIGS. 3 and 4. The lowest row may contain the highest frequency coefficients (e.g. the HH quadrant, as illustrated in FIGS. 3 and 4), along with the LH quadrant. The output of the pipe 60D may be the next row up, also containing HH and LH coefficients. Accordingly, the level zero output of the pipe 60A may alternately feed the pipes 60E and 60D, depending on which coefficients are being produced. Using the example of FIG. 6, when the pipe 60A is producing C−D coefficients, the pipe 60A may feed the pipe 60E. When the pipe 60A is producing A−B coefficients, the pipe 60A may feed the pipe 60D. In general, a given section of the pipe 60A may feed a number of pipes 60B-60D that is equal to the number of coefficients that the section generates for a given tile. It is noted that, because pipes 60D-60E only output coefficients from the first pass in this example, the L2 output from these pipes may be bypassed. Accordingly, the L2 output is not shown for these pipes in FIG. 9. In other embodiments, the L2 output may be used as well for additional compression.

The pipe 60A may have clock gaters similar to the above discussion of pipe 60. The pipes 60B-60E may also have clock gaters, including clock gaters on the initial section of the pipes. The initial clock gaters may enable the initial section based on the pattern at which the pipe 60A provides coefficients to that pipe (e.g. every fourth clock for the pipes 60D and 60E, where the two pipes are 180 degrees out of phase, every fifth clock for pipes 60B-60C, etc.). For a given embodiment, the pattern of clock enables may depend on the transform implemented by the transform circuit 52 and the size of the tiles.

It is noted that, while the above discussion applies the wavelet transform to the columns of the tile first using pipe 60A, and then to the rows using pipes 60B-60E, the opposite may be performed as well (first the rows, then the columns). Generally, the pipe 60A may operate on one dimension of a tile and the pipes 60B-60E may operate on the other dimension. There may be a pipe 60B-60E for each row in the tile (or each column in the tile, for embodiments which apply the transform to the rows first in the pipe 60A). Generally, there may be a pipe 60B-60E for each pixel in the second dimension of the tiles.

Figure 10:
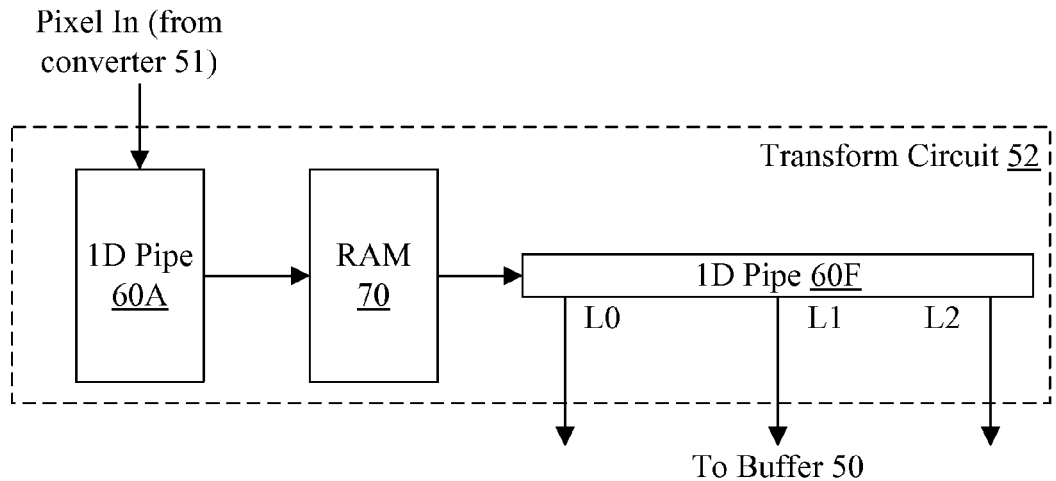
FIG. 10 is a block diagram illustrating another embodiment of the transform circuit shown in FIG. 5 implementing multiple instances of the pipeline shown in FIG. 7.

Turning now to FIG. 10, a block diagram of another embodiment of the transform circuit 52 is shown implementing multiple instances of the pipe 60 to perform a wavelet transform on a tile of image data. The embodiment of FIG. 10 includes pipe 60A, similar to the above discussion with regard to FIG. 9, which may operate on one dimension of the tile (e.g. the columns, or alternatively the rows) and another pipe 60F which may operate on the other dimension (e.g. the rows, or alternatively the columns). In this embodiment, the pipe 60A is coupled to a memory buffer (e.g. a random access memory, or RAM) 70 that stores the coefficients generated by the pipe 60A. The pipe 60F may read the coefficients when they are ready for a row, and may transmit results to the buffer 50. This embodiment implements two pipes and a memory, and thus may be more efficient area-wise than an implementation similar to FIG. 9 if a large number of pipes would result from the tile configuration.

Figure 11:
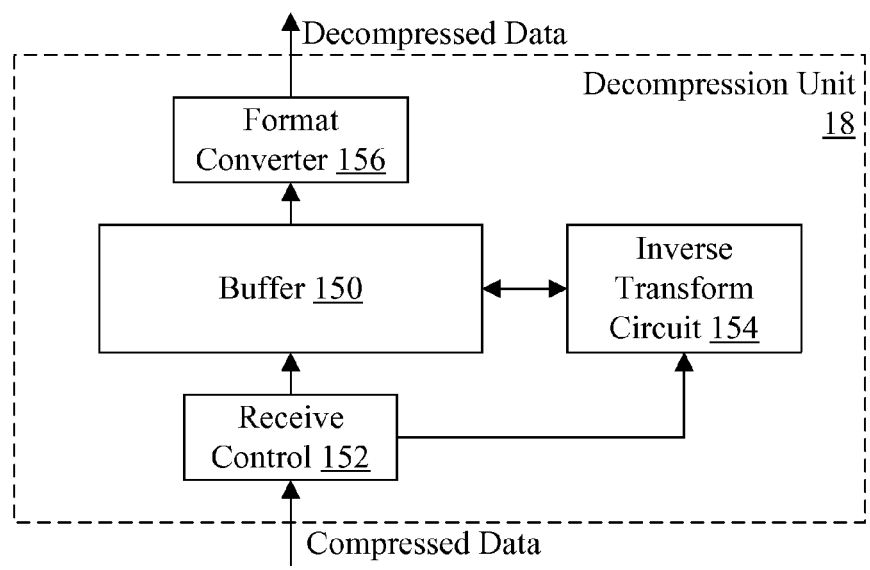
FIG. 11 is a block diagram of one embodiment of a decompression unit.

FIG. 11 is a block diagram of one embodiment of a decompression unit 18. In the embodiment of FIG. 11, the decompression unit 18 includes a buffer 150, a receive control circuit 152, an inverse transform circuit 154, and a format converter 156. The receive control circuit 152 is coupled to receive compressed data and is coupled to the buffer 150 and the inverse transform circuit 154. The inverse transform circuit 154 and the format converter 156 are coupled to the buffer 150 as well, and the format converter 156 is coupled to output decompressed data.

The buffer 150 may be configured to store a tile of data, or more than one tile, in various embodiments. Initially, the buffer 150 may store the list of coefficients received by the receive control circuit 152, and subsequently the data may be transformed back to the original tile data (or an approximation thereof, for lossy compression). Accordingly, the receive control circuit 152 may perform the decompression. The receive control circuit 152 may receive the compressed data (e.g. in the form of coefficient list addresses and coefficient values) and may reconstruct the transformed tile in the buffer 150. The inverse transform circuit 154 may be configured to apply the inverse of the transformations applied to the data by the compression unit 16, in the reverse order that the transformations were applied if more than one is used. The format converter 156 may be configured to convert the data to RGB format from YUV, and may be optional and not included in some embodiments if format conversion is not performed.

Figures 12, 13:
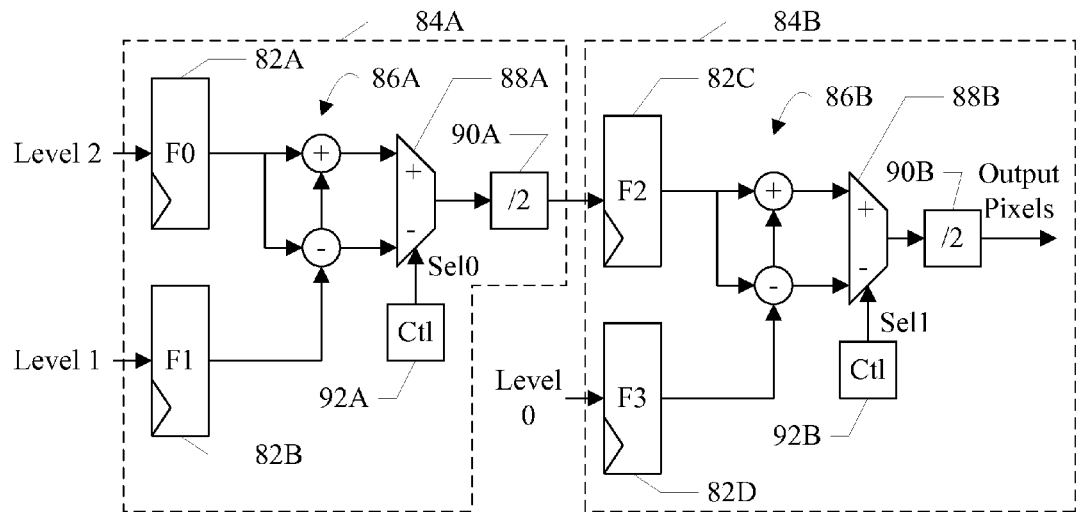
FIG. 12 is a block diagram illustrating additional details of one embodiment of the decompression unit shown in FIG. 11.
FIG. 13 is a table illustrating operation of one embodiment of the pipeline shown in FIG. 7.

The inverse transform circuit 154 may implement a pipe to perform the inverse transformation as well. For example, FIG. 12 is an embodiment illustrating the inverse transform pipe 80 corresponding to the example of FIG. 6. The embodiment of FIG. 12 includes sections 84A-84B. Since the pipe 80 is performing an inverse operation as compared to the pipe 60, the arrangement may be an inverse of the arrangement of pipe 60. Thus, for example, the pipe 80 may include flops 82A-82D in a parallel configuration within a section 84A-84B rather than a serial configuration. Additionally, the sums and differences may be fed in series from one section to the next. Furthermore, the pipe 80 may operate first on the level two and level one values (pipe section 84A) and then on the results of that section and the level 0 values (pipe section 84B).

In general, the number of sections 84A-84B in the pipe 80 may be equal to the number of iterations of the wavelet transform that are applied to the data. The circuitry in the section may be based on the definition of the wavelet transform that is implemented. In the illustrated embodiment, the wavelet transform calls for sums and differences of two pixels/coefficients. Other embodiments may optionally scale one or more of the pixels, coefficients and/or may operate on more pixels/coefficients. Furthermore, the operations may include other operations than sums and differences (e.g. multiplication, division, etc.).

Each section of the pipe 80 may have a similar configuration. A pair of flops (82A-82B in section 84B, 82C-8D2 in section 84B) may be coupled to receive coefficients and have outputs coupled to sum and difference circuitry 86A and 86B, respectively. Embodiments which scale values as part of the transforms may include scale circuitry in addition to the sum/difference circuitry. The sum and difference outputs may be coupled to a mux 88A and 88B, which is coupled to a divide by 2 circuit 90A and 90B (e.g. a right shift by one bit). The output of the section 84A may be the input to the flop 82C in section 84B. The flops 82A-82B are coupled to receive the level 2 and level 1 portions of a transformed tile, respectively, (in the order they were generated by the wavelet transform) and the flop 82D may be coupled to receive the level 0 portion of a transformed tile (in the order generated by the wavelet transform). Control circuits 92A-92B in the sections 84A-84B may generate the selection controls Sel0 and Sel1 (respectively) to select the sums (+ input to the muxes 88A-88B in FIG. 12) and differences (– input to the muxes 88A-88B in FIG. 12).

FIG. 13 is a table illustrating operation of pipe 80 based on the example of FIG. 6. Flops 82A-82D may be flops 0 to 3 in the table (as labeled on FIG. 12, F0 being flop 0, etc.). Sel0 and Sel1 are also illustrated in the table, and the control circuits 92A-92B may be configured to generate the selects as illustrating in FIG. 13. The level 2 and level 1 coefficients are clocked into the flops 82A-82B and held there while the sums and differences are propagated to the next state. The sum is selected through the mux 88A first, and the sum is 2A+2B. The divide by 2 circuit 90A removes the 2, resulting in A+B in the flop 82C. The first level 0 output is clocked into the flop 82D, and the sum and the difference of the flops 82C-82D are selected through the mux 88B in clocks clk1 and clk2. The sums are 2A and 2B respectively, and the divide by 2 circuit 90B removes the 2, resulting in A and B respectively. In clocks clk2 and clk3, Sel0 selects the difference output, providing C+D to the flop 82C. The flop 82D is provided C–D. Accordingly, in clocks clk3 and clk4, the second section 84B provides C and D, respectively.

It is noted that some embodiments of the inverse transform circuit 152 may include clock gaters to gate the flops in each section 84A-84B, similar to the clock gaters shown in FIG. 7 for the pipe 60. The clock gaters may be applied to the first section 84A in this embodiment, however, which is consistent with the inverse operation of the inverse transform circuit 154 as compared to the transform circuit 52.

Figure 14:
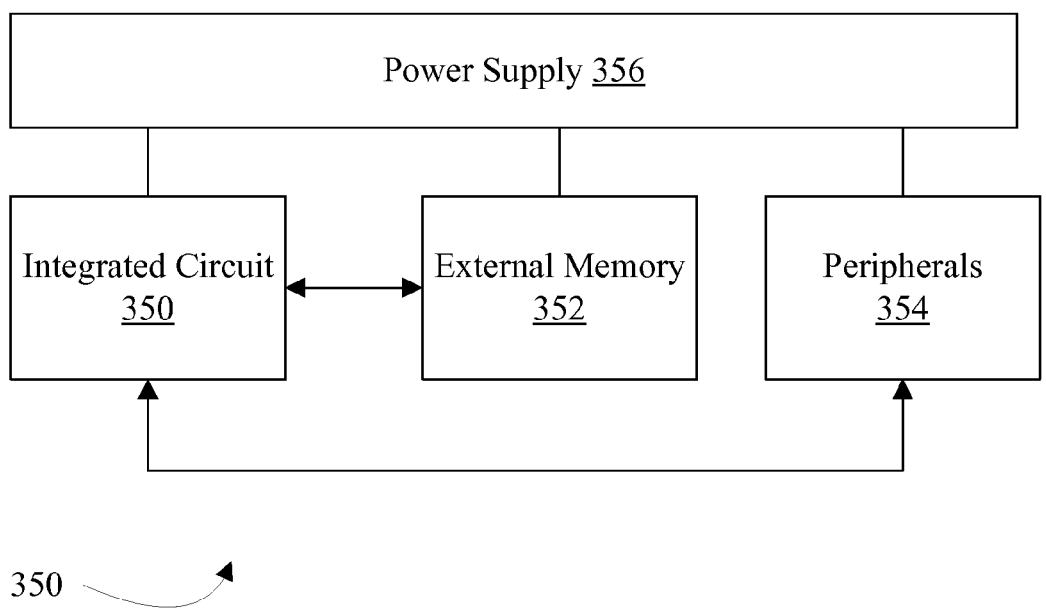
FIG. 14 is a block diagram of one embodiment of a system.

Turning next to FIG. 14, a block diagram of one embodiment of a system 350 is shown. In the illustrated embodiment, the system 350 includes at least one instance of an integrated circuit 350 coupled to an external memory 352. The external memory 352 may include the memory 24 illustrated in FIG. 2. The integrated circuit 350 may include the components illustrated in FIG. 2 and/or other components. The integrated circuit 350 is coupled to one or more peripherals 354 and the external memory 352. A power supply 356 is also provided which supplies the supply voltages to the integrated circuit 350 as well as one or more supply voltages to the memory 352 and/or the peripherals 354. In some embodiments, more than one instance of the integrated circuit 350 may be included (and more than one external memory 352 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A method comprising:
    receiving a stream of pixels;
    applying a multiple pass wavelet transform on the stream of pixels in a pipeline, wherein each level of the pipeline performs one pass of the transform and provides values to the next level of the pipeline to perform the next pass of the transform; and
    outputting values from each level of the pipeline to one or more second pipelines, wherein the pipeline applies the wavelet transform in one dimension of a tile represented by the stream of pixels, and wherein the one or more second pipelines apply the wavelet transform in another dimension of the tile.

2. The method as recited in claim 1 wherein the outputting further comprising writing the values output from the pipeline to a memory.

3. The method as recited in claim 2 further comprising reading the output of the pipeline from the memory into the one or more second pipelines.

4. The method as recited in claim 1 further comprising:
receiving coefficients corresponding to an image that has been compressed using the multiple pass wavelet transform; and
applying an inverse of the multiple pass wavelet transform in a third pipeline having a plurality of levels, each level corresponding to one of the multiple passes and providing values to another one of the plurality of levels.

5. The method as recited in claim 1 wherein the multiple pass wavelet transform includes different transforms in different passes.

6. A wavelet transform circuit comprising a first pipeline that includes a plurality of sections, wherein a first section of the plurality of sections is coupled to receive a serial transmission of a plurality of pixels corresponding to a tile in an image, and wherein the first section of the plurality of sections is configured to perform a first iteration of a wavelet transform on the plurality of pixels and to provide coefficients to a second section of the plurality of sections, wherein the second section of the plurality of sections is configured to perform a second iteration of the wavelet transform on the coefficients from the first section to generate second coefficients.

7. The wavelet transform circuit as recited in claim 6 further comprising a clock gater circuit coupled to receive an input clock corresponding to the plurality of pixels, and wherein the input clock is also coupled to the first section of the pipeline, and wherein the clock gater is coupled to provide an output clock to the second section of the pipeline, wherein the clock gater is configured to selectively gate the output clock to the second section.

8. The wavelet transform circuit as recited in claim 7 wherein the clock gater is configured to enable the output clock on clock cycles in which valid coefficients are being transmitted by the first section.

9. The wavelet transform circuit as recited in claim 8 wherein the clock gater is configured to enable the output clock in a pattern that is based on the wavelet transform implemented by the wavelet transform circuit.

10. The wavelet transform circuit as recited in claim 6 wherein each of the plurality of plurality of sections comprises:
a serial chain of flops configured to store input data; and
circuitry coupled to an output of each of the flops in the serial chain and configured to apply the wavelet transform to the outputs to generate corresponding coefficients.

11. The wavelet transform circuit as recited in claim 10 wherein the circuitry is configured to generate sums and differences of the outputs of the flops.

12. The wavelet transform circuit as recited in claim 11 wherein the circuitry is configured to scale at least one of the outputs prior to generating the sums and differences.

13. A wavelet transform circuit configured to apply a plurality of iterations of wavelet transform on a two-dimensional tile of image data, the transform circuit comprising:
a first pipeline configured to apply the wavelet transform in a first dimension of the tile, wherein the first pipeline comprises a first plurality of sections, each section applying one of the plurality of iterations to input data and outputting coefficients to a next section in the first pipeline; and
at least one second pipeline coupled to receive output coefficients from each of the first plurality of sections and configured to apply the plurality of iterations to the output coefficients in a second dimension of the tile, wherein coefficients output by the second pipeline are resulting coefficients for the transformed tile.

14. The wavelet transform unit as recited in claim 13 wherein the at least one second pipeline comprises a plurality of second pipelines.

15. The wavelet transform unit as recited in claim 14 wherein a number of the plurality of second pipelines is equal to a number of pixels in the second dimension of the tile.

16. The wavelet transform unit as recited in claim 13 further comprising a buffer coupled between the first pipeline and the at least one second pipeline, wherein the buffer is configured to store output coefficients from each of the first plurality of sections of the first pipeline for input to the second pipeline.

17. The wavelet transform unit as recited in claim 16 wherein there is only one second pipeline.

18. The wavelet transform unit as recited in claim 13 wherein the second pipeline comprises a second plurality of sections, each section of the second plurality of sections applying one of the plurality of iterations to input data and outputting coefficients to a next second in the second pipeline.

19. A compression unit comprising:
a wavelet transform unit coupled to receive an input pixel stream and configured to perform a multiple pass wavelet transform on the input pixel stream, the wavelet transform unit comprising a plurality of pipelines configured to perform the multiple passes in two dimensions on the input pixel stream to generate a plurality of coefficients that replaces the input pixel stream in an image; and
a buffer coupled to the wavelet transform unit and configured to store the plurality of coefficients generated by the wavelet transform unit.

20. The compression unit as recited in claim 19 further comprising a transmit circuit configured to read coefficients from the buffer and transmit the coefficients, wherein the transmit circuit is configured to transmit coefficients having higher significance prior to coefficients having lower significance.

21. The compression unit as recited in claim 20 wherein the transmit circuit is configured to form linked lists of coefficients having a same significance and to transmit the coefficients by traversing the linked lists in order of significance.

22. The compression unit as recited in claim 20 further comprising transmitting fewer than all of the coefficients to compress the image.

23. An inverse wavelet transform circuit comprising:
a first pipeline coupled to receive coefficients corresponding to a tile of image data, wherein the first pipeline is configured to apply a plurality of passes of an inverse wavelet transform on the coefficients in a first dimension of the tile, wherein the first pipeline includes circuitry to take sums and differences of the coefficients and to divide the sums and differences to perform the inverse transforms.

24. The inverse wavelet transform circuit as recited in claim 23 wherein each state of the first pipeline is coupled to receive coefficients that correspond to a particular pass of the wavelet transform that is being inverted.

* * * * *